US007139551B2

(12) United States Patent
Jamadagni

(10) Patent No.: US 7,139,551 B2
(45) Date of Patent: Nov. 21, 2006

(54) SYSTEM AND METHOD FOR AUTOMATICALLY DOWNLOADING SOFTWARE APPLICATIONS TO A REMOTE TERMINAL

(75) Inventor: Nanjunda Swamy Satish Jamadagni, Bangalore (IN)

(73) Assignee: Sasken Communication Technologies Ltd., Bangalore (IN)

( * ) Notice: Subject to any disclaimer, the term of this patent is extended or adjusted under 35 U.S.C. 154(b) by 479 days.

(21) Appl. No.: 10/054,357

(22) Filed: Jan. 19, 2002

(65) Prior Publication Data
US 2003/0143988 A1 Jul. 31, 2003

(51) Int. Cl.
*H04M 11/10* (2006.01)

(52) U.S. Cl. ............... 455/412; 455/412.2; 455/414.3; 455/418

(58) Field of Classification Search ........... 455/418, 455/412.1, 412.2, 456.1, 456.3, 412, 414.3; 709/217–219; 705/14
See application file for complete search history.

(56) References Cited

U.S. PATENT DOCUMENTS

| | | | | |
|---|---|---|---|---|
| 6,052,600 | A * | 4/2000 | Fette et al. ............... 455/509 |
| 6,343,317 | B1 * | 1/2002 | Glorikian ................ 709/218 |
| 6,687,901 | B1 * | 2/2004 | Imamatsu ................ 717/173 |
| 6,813,501 | B1 * | 11/2004 | Kinnunen et al. ........ 144/145.1 |
| 2002/0068573 | A1 * | 6/2002 | Raverdy et al. ........... 455/445 |
| 2002/0068608 | A1 * | 6/2002 | Souissi .................... 455/557 |
| 2003/0060211 | A1 * | 3/2003 | Chern et al. ............. 455/456 |
| 2005/0170825 | A1 * | 8/2005 | Dowling ................. 445/418 |

OTHER PUBLICATIONS

Jamadagni, Satish, A Push Download Architecture for Software Defined Radios, IEEE, 2000, pp. 404-407.*

* cited by examiner

*Primary Examiner*—Nay Maung
*Assistant Examiner*—Angelica M. Perez
(74) *Attorney, Agent, or Firm*—Welsh & Katz, Ltd.

(57) ABSTRACT

A system for automatically downloading radio or protocol personalities over defined channels to a mobile terminal. The system includes an adaptable terminal, a spatial location service for providing geographic location information to the associated terminal, at least one component repository, and a server directory.

The component repository includes at least one downloadable component and a service template that defines the service attributes of said downloadable component, The terminal includes a location module in communication with the spatial location service to define the geographic location of the mobile terminal. A User Agent for locates downloadable components in the defined geographic location using a service request that enumerates the service needs of mode attributes.

18 Claims, 8 Drawing Sheets

| Message Type | ID | Description |
| --- | --- | --- |
| Service Request | 1 | UAs find service by type, scope and search filter |
| Service Reply | 2 | DA (or SA) returns service URLs and their lifetimes |
| Service Registration | 3 | SAs register Service URLs and attributes |
| Service Deregister | 4 | SAs deregister service URLs and attributes |
| Service Acknowledge | 5 | Das acknowledge a successful registration or deregistration |
| Attribute Request | 6 | UAs find attributes by service type or by service URL |
| Attribute Reply | 7 | DA (or SA) returns attributes information |
| DA Advertisement | 8 | DA sends its Service URLs, scope and attributes |
| Service Type Request | 9 | UAs find service types by scope |
| Service Type Reply | 10 | DA (or SA) returns a list of service types. |
| SA Advertise | 11 | SA sends its service URL, scope and attributes |

FIG. 6

| 00 | Version | Function ID | Length |
|---|---|---|---|
| 04 | Length Contd | Flags | Next Extension |
| 08 | Next Extension offset contd | | XID |
| 0C | Language Tag Length | | Language Tag |

| 0 | | | | | | | | | 1 | | | | | | | | | 2 | | | | | | | | | 3 | | | |
|---|---|---|---|---|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 | 0 1 |

| Service location Header (Function = SrvRqst = 1) ||
|---|---|
| Length of <prList> | <prList> String |
| Length of <Service-type> | <prList> String |
| Length of <Scope-list> | <Scope-list> String |
| Length of predicate string | Service request <predicate> |
| Length of <SLP SIP> string | <SLP SIP> String |

SYSTEM AND METHOD FOR AUTOMATICALLY DOWNLOADING SOFTWARE APPLICATIONS TO A REMOTE TERMINAL

FIELD OF THE INVENTION

The present invention pertains to system for providing automatic download to an associated terminal. More particularly, the present invention pertains to a system and method for automatically downloading software to a remote adaptable terminal, supported by enhanced Service Location Protocol and enhanced Wide Area Service Location Protocol architecture.

BACKGROUND OF THE INVENTION

Multi-mode and Software Defined Radio (SDR) terminals are adaptable terminals capable of acquiring radio personalities, modes and applications by software download. Examples of where such radios may be useful include cellular/PCS telephony and mobile computing. The ability to remotely download, plug and play new communication protocols, mode components and services using existing hardware, enables the terminal to perform a variety of different functions when located in different locations.

Static and dynamic downloading are two common approaches for downloading applications to a SDR terminal. Static download generally occurs when the SDR terminal is not actively running any service or application. Alternatively, dynamic download generally occurs through a logical channel over a protocol while the terminal is in use. Dynamic download is ideally invoked when the mobile terminal approaches the "edge" of a service area, where the terminal's required services and other technologies are not available. Dynamic download can also be triggered by the terminal's Quality of Service requirements.

None of the current static or dynamic download systems provide mechanisms that enable Over-The-Air automatic download to a mobile terminal. Accordingly, there exists a need for a system and method for automatically downloading software to a terminal Over-The-Air.

The present invention provides a system supported by location or context awareness mechanism and further supported by signaling and download mechanisms that function over any wireless link protocol. It is desirable that the system enables a terminal or user to query for services available in a selected location supported by an extended Service Location Protocol (SLP) and Wide Area Service Location Protocol (WASLP) framework. It is further desirable that the system includes a geographic location service and spatial location protocol supported in a wireless network. Additionally, it is further desirable that the system enables the discovery, automatic selection and download of network download services and subsequent registration of wireless access services.

It is further desirable that an adaptable terminal is provided for locating and receiving automatic downloadable software.

SUMMARY OF THE INVENTION

A system for automatically downloading radio or protocol personalities over defined channels to a mobile terminal is provided. The system includes an adaptable terminal, a location server, for providing geographic location information to the associated terminal, at least one component repository, and a server directory.

The component repository includes at least one downloadable component. The system adheres to an enhanced service location protocol and wide area location protocol. A service template that defines the needed service attributes for the terminal.

The terminal includes a location module in communication with the spatial location service to define the geographic location of the mobile terminal. A User Agent locates downloadable components in the defined geographic location using a service request enumerates the service needs of the terminal.

BRIEF DESCRIPTION OF THE DRAWINGS

The benefits and advantages of the present invention will become more readily apparent to those of ordinary skill in the relevant art after the following detailed description and accompanying drawings, wherein:

FIG. 6 is a diagram of example Service Location Protocol messages for performing automatic download;

DETAILED DESCRIPTION OF THE INVENTION

Figure 1:
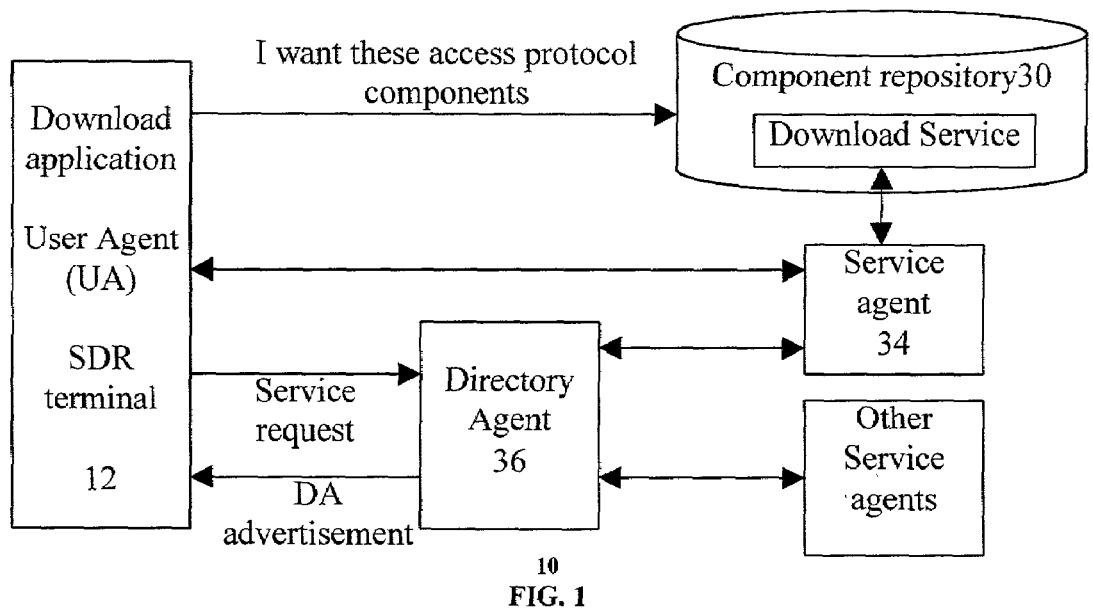
FIG. 1 is block diagram of a system for downloading applications to an associated multi-mode terminal, adhering to a Service Location Protocol architecture, in accordance with one example of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated. It should be further understood that the title of this section of this specification, namely, "Detailed Description Of The Invention", relates to a requirement of the United States Patent Office, and does not imply, nor should be inferred to limit the subject matter disclosed herein.

In the present disclosure, the words "a" or "an" are to be taken to include both the singular and the plural. Conversely, any reference to plural items shall, where appropriate, include the singular.

Referring now to the drawings, more particularly FIGS. 1–4, there is shown a system 10 for automatically downloading applications to an adaptive terminal 12. The system 10 includes an adaptive terminal 12, a location server 14, a component repository 30, a download server 32, a Service Agent 34, a Directory Agent 36 a registration server 38, and an access router 40. The terminal 12 of the system 10 includes a location module 16, a download module 18, a mode cache 20, a SLP module 22, a reconfiguration module 24, an air interface module 26 and a user interface 28.

The system 10 provides for automatic downloading of modes and applications available in a wide area network or domain, to the terminal 12. Downloadable modes and applications can vary from end-user applications to a physical layer algorithms including device driver software for mobile terminals, software components, software patches or upgrades.

Figure 2:
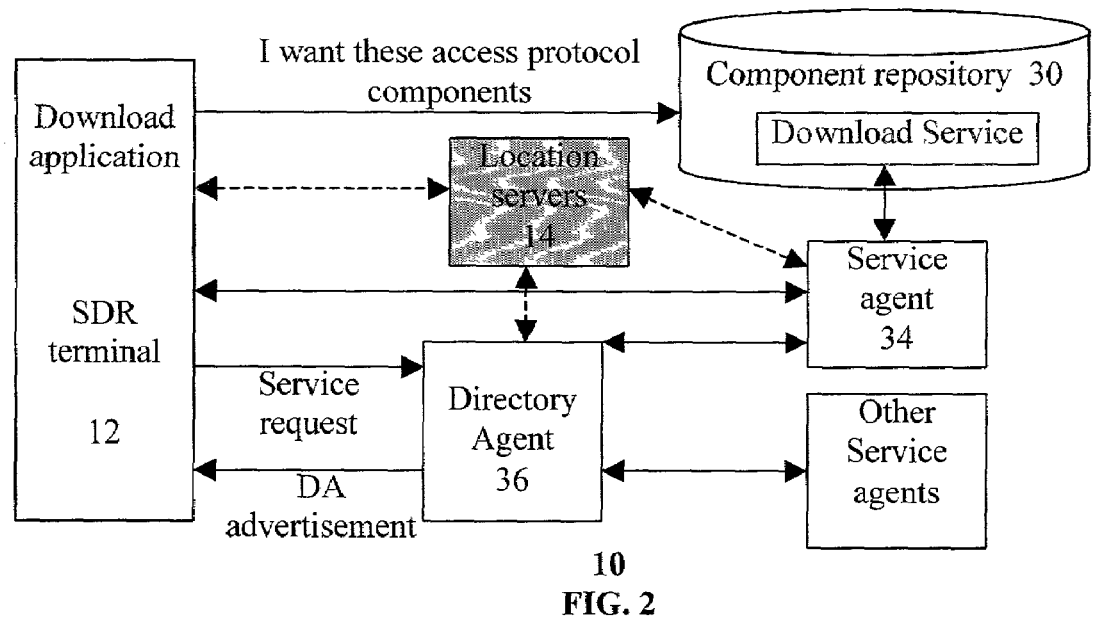
FIG. 2 is block diagram of a system for providing automatic download adhering to an extended Service Location Protocol architecture, in accordance with another example of the present invention.
Figure 3:
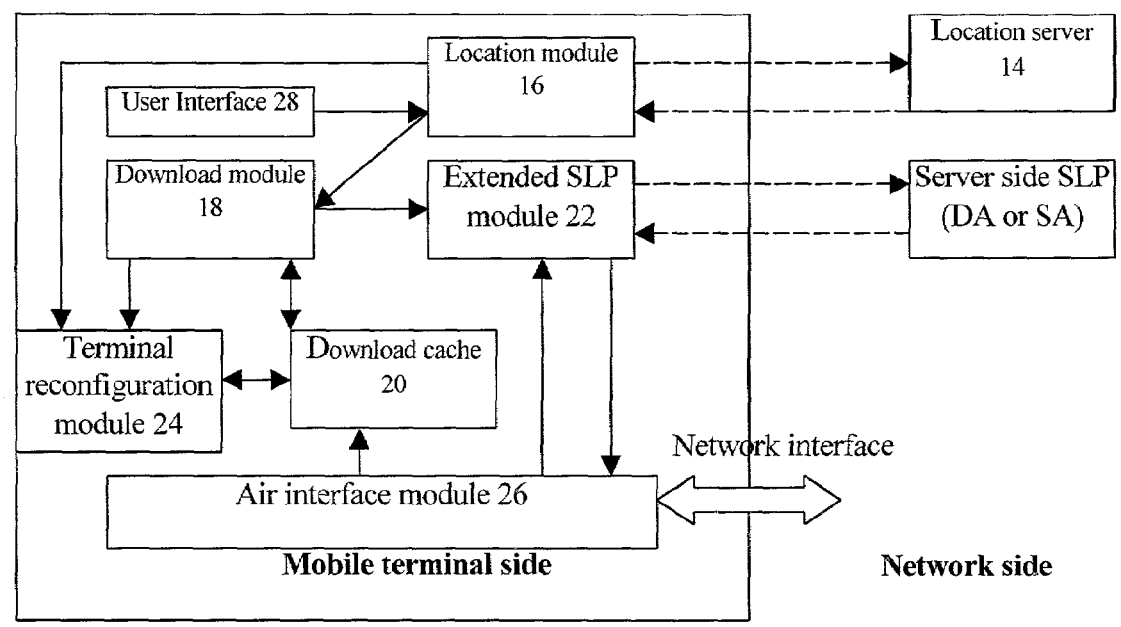
FIG. 3 is a block diagram illustrating terminal interactions with the system, in accordance with one example of the present invention.
Figure 4:
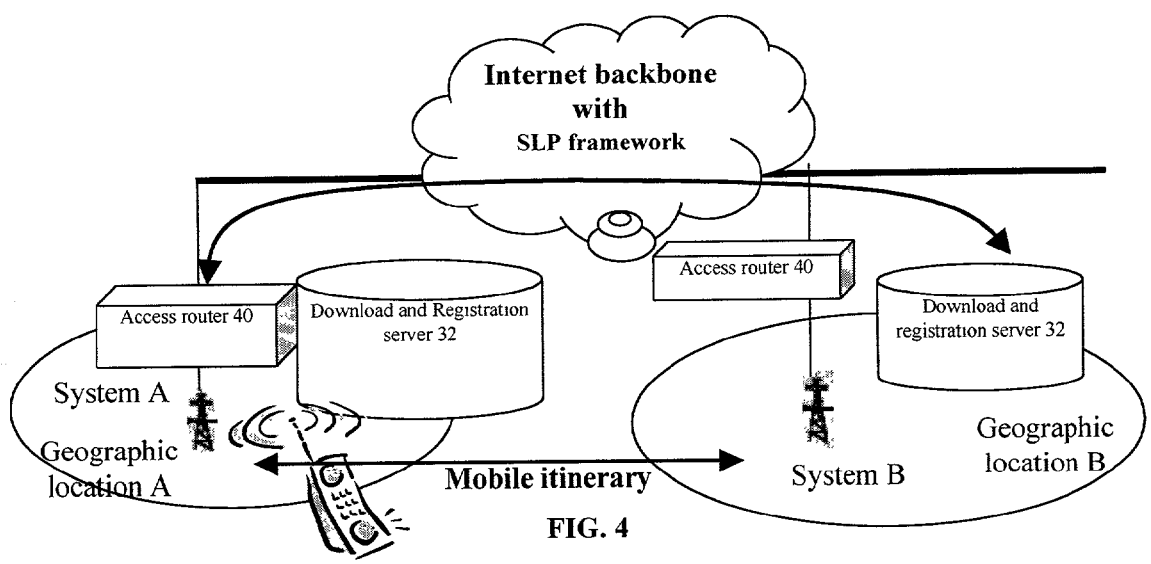
FIG. 4 is a diagram illustrating a system for automatically downloading applications across subsystem geographic boundaries, in accordance with one example of the invention.
Figure 5:
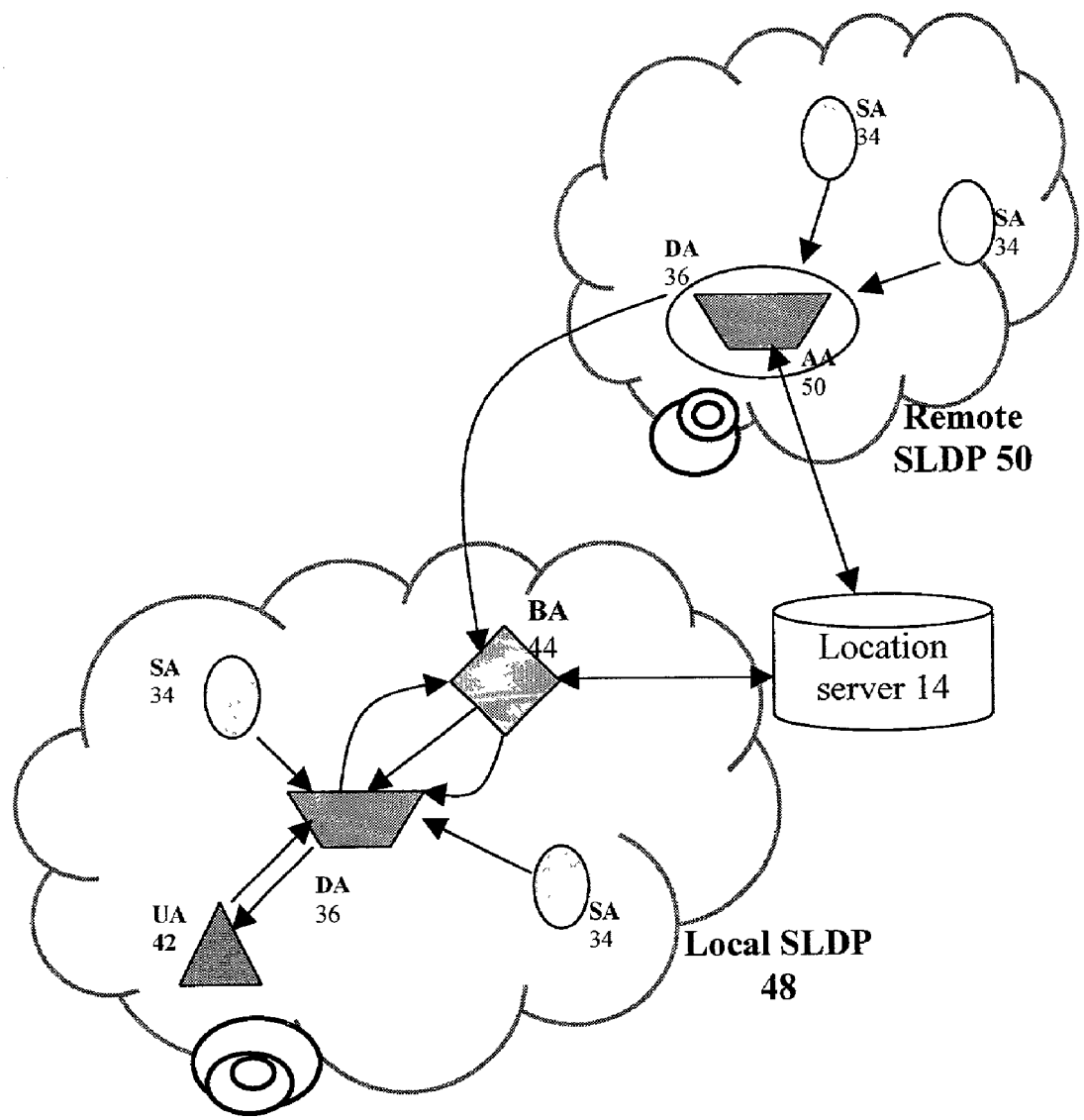
FIG. 5 is diagram illustrating an example of an extended Wide Area Service Location Protocol architecture for enabling automatic software download.

The system 10 is supported by an extended Service Location Protocol (SLP), as illustrated in FIG. 2, and an extended Wide Area Service Location Protocol, illustrated in FIG. 3. Preferably, the Wide Area Service Location Protocol is in accordance with standards set forth by the International Engineering Task Force (IETF).

System 10 is supported by an extended Service Location Protocol to automatically resolve a terminal's service needs in the enterprise and mobile environment. The extended SLP is a flexible and scalable framework for service discovery in the IP network. The system uses the SLP protocol in combination with supported location servers and location queries from the terminal to provide automatic software download to the terminal. Extensions to the Service Location Protocol provide geographic location information necessary for download to the terminal across the Wide Area Network and Internet. This location information is used in combination with the user's mobility itinerary to select a location. Download queries that meet the terminal's service needs are based on the selected geographic information.

The framework enables a user to conveniently find available service types, locations (URLs) where a specific service is provided, and service descriptions. In SLP terminology, Service locations can be described by URLs such as http://www.srvloc.org. or or identified by the "service:" URL scheme such as service:lpr.//mandolin.cs.columbia.edu.

Each service has a "service type," e.g., the service type of http://www.srvloc.org and service:lpr://mandolin.cs.columbia.edu is http (web service) and service:download (Mode Download service), respectively. "Service descriptions" are expressed as attribute/value pairs such as "resolution=1200 dpi" for a printing service. SLP uses "service scopes" to arrange services into groups. A scope could indicate a geographic location such as "London", an administrative group such as "Law School", or other category such as "Emergency".

As shown in FIGS. 1–4, the multi-mode terminal 12, in connection with location server 14 enables the system 10 to identify and monitor the terminal's 12 location. The terminal 12 has a location module 16 and a download module 18, which identifies and selects downloadable services and modes available to the terminal 12, in a selected location. The terminal 12 further includes a mode cache 20 for storing modes and applications.

The terminal 12 is adaptable for running downloaded applications or modes. Notably, it is contemplated that terminal 12 can be a type of adaptable terminal 12, such as a cellular/PCS telephone, Personal Digital Assistant (PDA), mobile computer, or the like, without departing from the scope of the present invention.

The Wide Area Service Location Protocol and Service Location Protocol framework are enhanced to support mode availability queries based on geographic location provided by the terminal 12 or location server 14, or both. The system 10 determines the current location and/or the projected location of the terminal 12. Prior to entering the location, the download module 18 initiates the download process through interaction with the location module 16. The location server 14, in connection with the terminal's location module 16, identifies and monitors the geographic location of the terminal 12. The location module 16 queries the location server 14 for adjacent regions. This can be accomplished using symbolic or geometric locator functions and/or other various functions supported by the location server 14.

The location 14 server can support a variety of location queries including, but not limited to: basic queries by the mobile terminal 12 to determine the terminal's location, sub-location queries, super-location queries, queries requesting all of mobile terminal's locations, and sighting queries.

Sub-locations are defined as location areas that fall within another location area. For example, "San Francisco" is a sub-location of the super-location area "California". The location server 14 can maintain sub-location and Super-location maps and designated symbols.

Sighting queries request and list a "few" location areas that the mobile terminal 12 has recently traversed in the recent past. Collocation queries are requests to the location server 14 for all locations that are in the neighborhood of the specified location. One example of a collocation query is a request for modes and services located in the city of a Bangalore. The location server 14 responds to this request with mode and service information for Bangalore as well as neighboring cities of Bangalore, such as "Mysore"

In one example of the present invention, it is contemplated that the location server 14 uses symbolic location data and functions to define the terminal's 12 location in the system 10. The location server 14 maintains a database containing a map of locations in the area represented by symbolic data.

The terminal 12 or another location server 14 orders mode information from the location server 14 using symbols. The hierarchy of locations can be maintained according to spatial containment relations. For example, the geographic location "New York City" is contained within the geographic location of the "United States of America".

For example, when the location server 14 provides a database (not shown) assigned to an area or location. The database assigns a name or symbol to every possible location. The terminal 12 queries the location server 14 specifying a "SymbolicLocator" or a particular location that the terminal 12 desires to know of the available and downloadable modes or services supported in that location.

The location server 14 and the mobile terminal 12 support the symbolic location model. The model designates locations using abstract symbols, for example \Room 429", \India\Karnataka state", \Huxley Building", or \Canterbury cathedral". These symbols are used in a scope field of a Service Location Protocol message to indicate to the location server 14 the relevance of the protocol mode or a service located in that location area. For example, the mobile terminal 12 specifies to the server 14 a "SymbolicLocator" such as "\KARNATATAKA\BANGALORE". The server 14 retrieves mode information regarding the input "SymbolLocator", or in this case "Karnataka\Banglore"

The mobile terminal 12 also can query for specific locations and co-locations to a selected location specified by the "SymbolicLocator". The mobile terminal 12 can indicate a specific location in which it desires to download modes from. Using symbols, the terminal requests the mode information from the location server 14 in that area. For example, the mobile terminal 12 can indicate a location "FRANCE". In this case, modes are downloaded to the terminal 12 and the terminal 12 is reconfigured enabling the terminal 12 to "run" modes and services located in France.

In another example, the system 10 uses a geometric location model supported by the location server 14 and the mobile terminal 12. The location server 14 uses a database that assigns locations according to longitudinal and latitudinal locations such as a "GeometricLocator". This enables the terminal 12 to query the server 14 for modes and applications located in locations and co-locations 12 using coordinates. In addition, the location server 14 provide collocation or adjacency queries on a location granularity negotiated by the terminal 12 and the location server 14.

In another example of the invention, the location module 16 uses a Global Positioning System (GPS) to determine the location of the mobile terminal 12. Typical Global Positioning Systems define locations using latitude and longitude information to define locations. If desired, the coordinate information can be converted into an alternative form, such as symbolic or geometric information, to be processed by the terminal location module 16. This location information can be used to further query the location server 14 for collocation information.

In another example, the mobile terminal's 12 location can be determined by tracking the location of the terminal 12 using the location server 14. The location server 14 maintains a list of the terminal's 12 locations over a time period and provides the location module 16 with a defined regular mobility area.

It is also contemplated that the location module 16 can determine the terminal location. In this manner, the location module 16 keeps track or monitors locations that the terminal is and has been most regularly located to form a regular location area to be used to generate a mode query.

In another example, the user can proactively fill in his mobile itinerary. The mobile itinerary can include projected locations that the user plans to travel as well as the approximate time that the user plans to be in those locations. As such, this information can be used to prompt a mode search in the locations area provided by the user.

When the user is located near a transportation center, such as an airport or Bus terminal or in a moving car, the terminal 12 or location server 14 can use location information to prompt a mode query for a selected location area.

The user can also proactively input his projected mobile itinerary. As such, the location server 14 notifies the mobile terminal 12 of any "major transit points" like airports, bus-terminals, entry regions to inter city or state highways, which are located in the geographic locations. Once the location of the terminal 12 has been determined, the location module 16 prompts. The user provides information to the terminal 12 and location server 14 of any major mobility plans such that the location server 14 can search surrounding areas to identify modes, and applications in those areas.

Once the projected or selected location of the terminal 12 is determined, the download module 18 queries the system 10 for available appropriate modes and services in the terminal's current location, co-locations, and other locations that may be traveled.

The selected or specified location information is sent from the location module 16 to the download module 18. The download module 18 receives this information and queries the mode cache 20 for available modes to verify that all modes or a subset of modes for continued operation in that location are available in the mode cache 20. The download module 18 selects from a group of available modes the best mode or application for the terminal 12. The download module 18 determines if the terminal 12 is located or will be moving to a location where the terminal's 12 existing modes and services are not supported by the area network. The system 10 automatically downloads services, modes and software available in those locations stored in a component repository 30, or like server, to the terminal 12. The terminal 12 stores or caches this information in the mode cache 20.

The location server 14 monitors services and modes available in co-locations and queries other location servers 14 associated within other mode service domains and stores this information. In general, co-locations are defined as location areas that fall outside the coverage range of the present mode in use by the terminal 12. However co-locations can also include locations and areas that are located within the coverage area of the present mode in use but where alternate mode services are available.

Illustrated in FIGS. 1–5 are examples of extended Service Location Protocol (SLP) and extended Wide Area Service Location Protocol (WASLP) framework. As illustrated, the supporting Service Location Protocol and Wide Area Service Location Protocol framework include, a User Agent (UA) 42, a Service Agent (SA) 34, a Directory Agent (DA) 36, a Broker Agent (BA) 44 and an Advertising Agent (AA) 50.

A User Agent 42 initiates service and mode discovery on behalf of the terminals download module 18. The User Agent 42 acquires applications, modes or services needed by the terminal 12 to operate in a selected location's mode network service.

The Service Agent 34 represents a particular service offered in a particular area or domain. The Service Agent 34 responds directly to the User Agent's 42 queries. The User Agent 42 sends queries to Service Agent 34 via multicast and/or, to an available Directory Agent 36 via unicast.

The User Agent 42 can use several different types of SLP messages to discover the download services, such as: a service type request (SrvTypeRqst) message to get a list of all available service types in a service type reply (SrvTypeRply) message, an attribute request (AttrRqst) message to get a list of all attributes for a given service type or a specific service instance in an attribute reply (AttrRply) message, and a service request (SrvRqst) message with an attribute predicate specifying the characteristics of the desired service to get a list of URLs giving the locations of matched services in a service reply (SrvRply) message. Examples of messages supported by the Service Location Protocol and Wide area Service Location Protocol architecture are illustrated in FIG. 6.

The SrvTypeRqst, Srv-TypeRply, AttrRqst and AttrRply messages enable the User Agent 42 to select an available service type and their attribute. This information can be used to construct service queries in SrvRqst messages. Using the desired service type i.e. download service, and a set of attributes describing the service, (which can be the geographic location area where modes are being sought), SLP provides the service addresses (URLs) to the user.

In one example, the terminal 12 requests the attributes of a specific mode supported in a specified service area. The "Attribute Request" message of the SLP format can be used for obtaining the mode attributes (type attributes). For component download the User Agent 42 (SDR terminal) may also form "Service Requests" using pre-configured knowledge of a Service Type's attributes. It may also issue "Attribute Requests" to obtain the attribute values for a "Service Type" before issuing Service Requests. Having obtained the attributes, which describe a particular kind of service through an "Attribute Request" message, the SDR terminal 12 can build a predicate that describes the service needs of the user.

Directory Agents 36 can serve as centralized information repositories 30 in an enhanced SLP system 10. If Directory Agents 36 are present, the Service Agent 34 can register with the Directory Agent 36 using service registration (SrvReg) messages. The Directory Agents 36 receive registrations from Service Agents 34 and respond to User Agent 42 queries. Directory Agents 36 can be discovered either actively or passively by the User Agent 42. In passive Directory Agent 36 discovery, User and Service Agents 42, 34 scopes an administratively multicast address for unsolicited Directory Agent 36 advertisement messages (DAAdvert) sent periodically to the address.

The system 10 supports incremental service registration, in which a Service Agent 34 can add or change attributes of a previously registered service. Thus, a SrvReg message can be used to fresh service registration or an update to a previous registration. A Service Agent 34 can also remove service listings from the Directory Agent 36 before they expire by sending service deregistration (SrvDeReg) messages.

The system 10 uses the geographic location information as provided by the mobile terminal 12 or the location server 14 as the "scope parameter." A scope in this invention indicates a geographic location such as "London." The scope field can indicate the geographic location information and the service type field can indicate a "download service." Service queries by the mobile terminal 12, service registrations by the Service Agent 34 and download service advertisements by the Directory Agent 36 can be scoped by the "geographic location." In such case, a mode being offered through the download service is relevant.

The system 10 uses an enhanced Wide Area Service Location Protocol to facilitate inter-domain or geographic location based automatic download to the associated terminal. The system 10 supported by an enhanced Wide area Service Location Protocol includes, a Broker Agent 44, a Directory Agent 36, a Service Agent 34, and an Advertising Agent 50. The broadcast or multicast of the download services for modes relevant in specific location areas can be done to surrounding collocations. Advertised services can be grouped in scopes where the administrators can configure which services to advertise and aggregate.

Within each SLP domain 48 and WASLP domain 50 of the system 10 the Directory Agent 36 and/or Service Agents 34 aggregate and advertise available services in the domain across the wide area to other domains. The User Agent 42 queries for downloadable services for modes relevant in location area can be handled by the Directory Agents 36 or Broker Agents 44 by referring to the Symbolic Locator and matching the Service Agents 34 that serve modes relevant to the specified or selected locations. The Broker Agents 44 and the Directory Agent 36 use the location server 14 to locate services designated service messages to provide the required services to the Service Agent 34. Such advertisements carry the location information where downloadable modes are relevant.

Mobile terminals 12 not located in the collocation scope of the Directory or Broker Agent 36, 44 advertisements can explicitly query the system for modes relevant in a location area. The Directory Agent 36 specializes in storing advertisements about some subnet of service type. Brokers 44 also advertise their expertise about some service type into their local SLP domain. The Broker Agent 44 receives information transmitted across the wide area network, such as advertisements and request for downloadable services and applications. The Broker Agent 44 also uses the geographic location information in the scope field of service queries or service registrations to bias their advertisements.

The Broker and Directory Agent 44, 36 use the location tag and query the location server 14 to redirect the mode search or query. The Directory and Broker Agent 36, 44 can also cache some location information locally to help them deal with location queries. The Broker, Directory Agent and Service Agent use the functions provided by the location server 14 for queries and location clarity.

In automatic download operation, the terminal 12 transmits a request for services available in a defined geographic location (L). The terminal 12 sends the request to the Directory Agent 36, in the local area domain. The Directory Agent 36 queries the location server 14 for the collocation information to bias the advertisements for the download mechanism. If the Directory Agent 36 cannot find the requested download service or Service Agents 24 that offer download services for modes relevant to the location query local, the Directory Agent 36 contacts a Broker Agent 44 for the service in the service location area. The Broker Agent 44 then locates a server in its database and access network in its coverage area and transmits this information back to the Directory Agent 36. The Directory Agent 36 then returns the download server information and the access network address to the terminal 12.

Figures 7, 8:
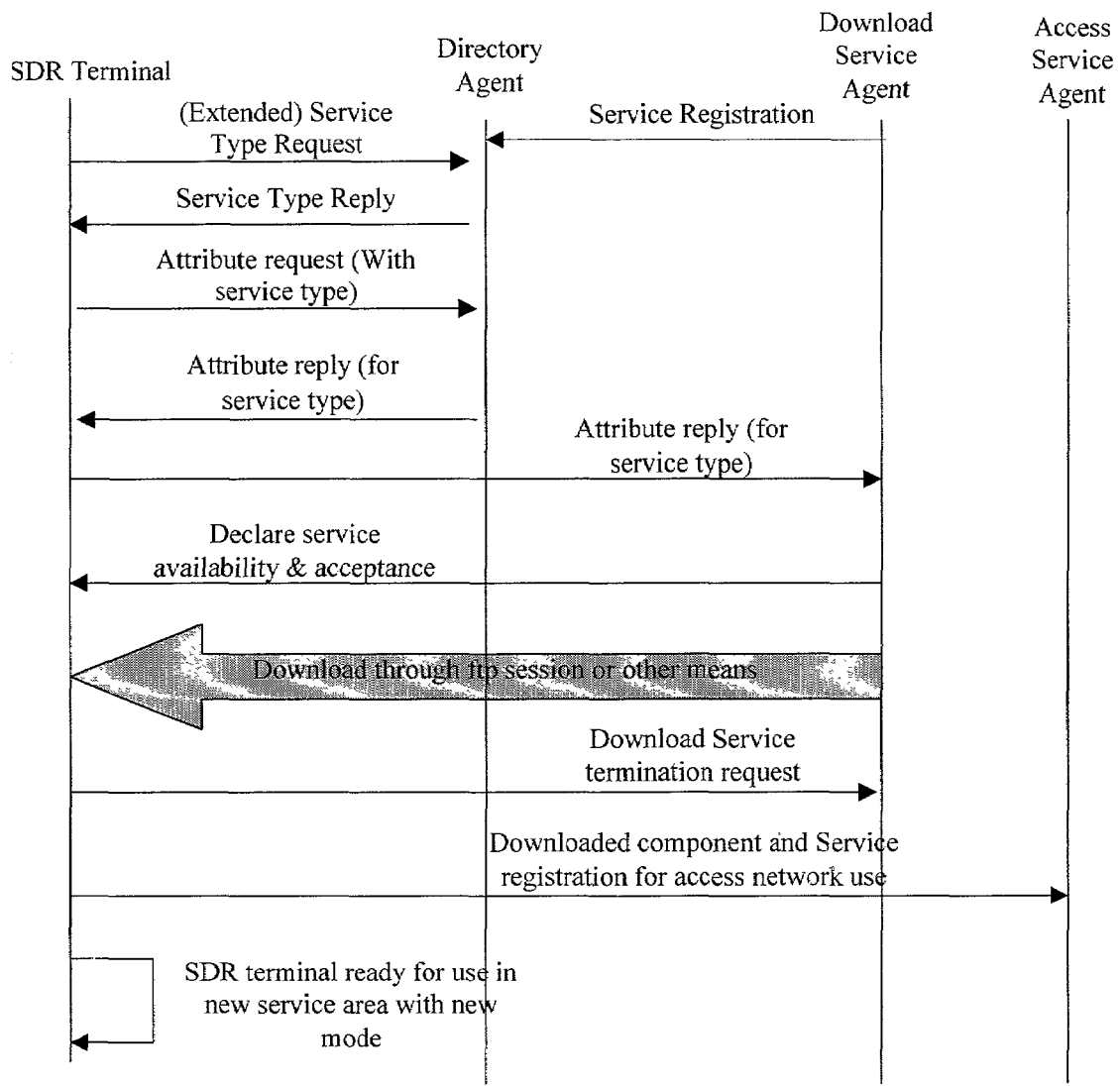
FIG. 7 is a diagram illustrating one example of the flow of messages adhering to an extended Service Location Protocol architecture.
FIG. 8 is a diagram illustrating an example of the SLP protocol message header.

Referring now to FIG. 7 there is shown a diagram illustrating one example sequence of message flow for the downloading of software using a "geographic location" scoped Service Location Protocol. The User Agent 42 transmits a "service request message" to the Service Agents 24 serving mode and service downloads for the selected location.

The service request message is transmitted between the Directory Agent 36, Service Agent 34, location servers 14 and terminal 12 to enumerate geographic location and service needs. The Directory Agent 36 and Service Agents 24 use this location information to locate services and modes supported in the specified location. The service request message satisfies the scope, i.e. location information where supported modes are being queried and the requested service type (the download service type) and matches the predicate.

If the terminal 12 does not have any information about the modes and services supported or the "Service Type" supported in a location area or a region of interest, it can issue a "Service Type Request" message. The SDR terminal 12 uses the "Service Type Request" message with the location scope to identify the modes supported in the given geographic location. The "Service Type Request" message can be used with the geographic location information as the scope. The location information can also be embedded in the predicate string. Geographic location information can also be used as a query scope in the example "Service Request" message of the IETF SLP protocol. In this manner, the service type message would be a for a specified "SDR component download service" located in the geographic location.

The system having an enhanced Service Location Protocol (SLP) can use service templates to provide a formal procedure for defining and using a new downloaded service type. Service templates are formal descriptions of service types and attributes and are human and machine understandable. Service templates are used for several purposes including, standardization of messages sent across the network. Once a template is serviced, all versions of the template are archived by the Internet Assigned Numbers Authority. In addition, servers that use conventional Service Location Protocol are registered using templates that specify values for their service attributes.

Figures 9, 10:
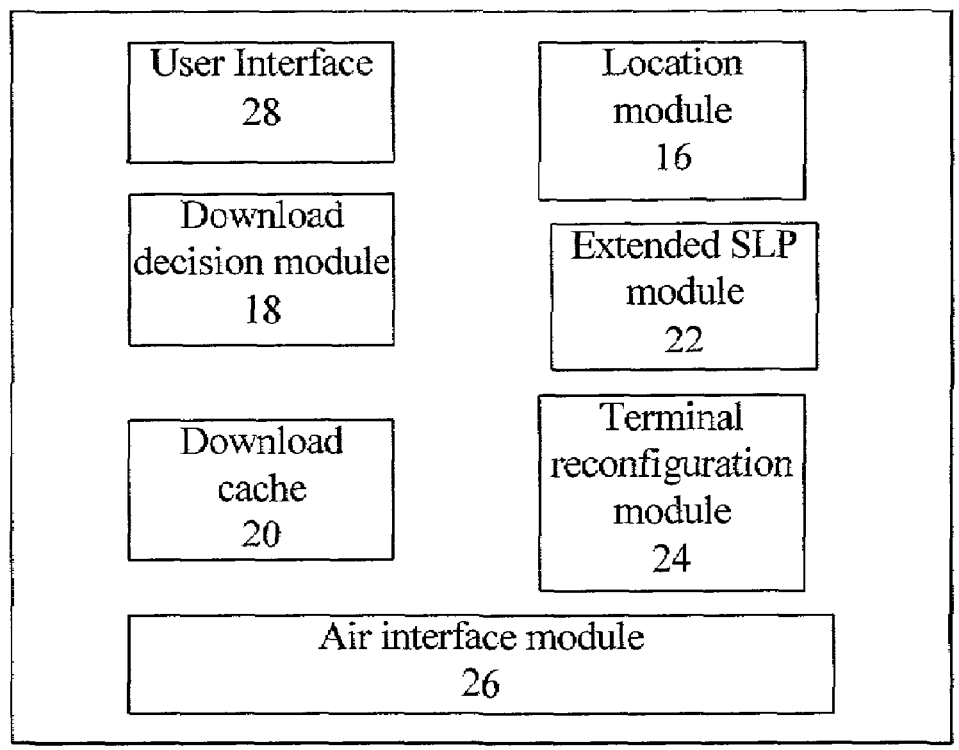
FIG. 9 is a diagram illustrating an example of a service request message format or template.
FIG. 10 is a block diagram of an adaptable Software Defined Radio or multi-mode terminal.

In the extended SLP, service templates capture the semantics and rules for service advertisement attributes and URLs. In addition, terminal applications can display service information. The template provides information and explanatory text, which may be helpful in informing the user through the terminal user interface 28. An example of a template used in the SLP architecture is illustrated in FIG. 9.

The Service templates can include a service type, which characterizes the general kind of service, the version number for the template, the language in which the attribute names and values are given, a description of the service type and a list of attributes. Geographic location information can also be included as a search or a service attribute in the service template. Service templates are used by Directory Agents 36 to organize and identify service registration information. Terminal applications use service templates to provide localized translations of service attribute strings. The User Agent 42 uses in the service message a service template to create a service request that enumerates appropriate service attributes for the terminal.

Headers can be used to provide information about the messages. FIG. 8 illustrates an example of a Service Location Protocol header diagram is shown. The function ID is an example of one of the SLP message types, which have been listed in the table above.

In the Service Location Protocol "service:" a URL scheme name can be used to define the URLs (called "service: URLs") which are intended to be used by the Service Location Protocol to distribute service access information. These schemes provide an extensible framework for client-based software to obtain software download and configuration information. When registering a service: URL, the URL can be accompanied by a set of well-defined attributes, which define the service. These attributes convey configuration information to terminal software, or service characteristics meaningful to end-users. One example of dynamically locating and loading a protocol device driver to an SDR terminal is illustrated below. In this case, the SDR terminal 12 uses the following three pieces of information before it can successfully load and initiate the driver:
1. The protocol used to load or download the driver code, for example, "ftp", "http" or "tftp"
2. A pathname identifying where the driver code is located, for example "/systemhost/drivers/GPRS/drivers.drv" (given that GPRS was the mode found to be supported in the given geographic location in the service typr request message),
3. The name of the driver, for example, "GPRS".

Using the above information, an example URL formation is achieved through the use of an abstract service-type. The service type is "device-drivers" One example of a service URL used by the terminal 12 is shown below:
service:SDR-download-device-drivers:ftp://x3.bean.org/drivers/drivers.drv;
driver=GPRS;platform=SDR-terminal3.2-rs3000
Other URLs for the same service using other protocols are also supported, as in:
service:SDR-download-device-drivers:tftp://x2.bean.org/vol3/GPRS/drivers.drv;
driver=GPRS;platform=SDR-terminal3.2-rs3000
service:SDR-download-device-drivers:http://www.bean.org/GPRS/drivers/drivpak.drv;
driver=GPRS;platform=SDR-termminal3.2-rs3000

Using Service Location Protocol, a search for the service type "SDR-download-GPRS-drivers" may return all of the three URLs listed above. At this point, the terminal 12 selects the most appropriate access protocol, mode or service and downloads this mode to the terminal 12.

As previously stated, the Service Agent 34 sends the User Agent 42 a service reply. The Directory Agents 36 maintains a directory of servers in the selected location. When the Directory Agent 36 or Service Agent 34 returns a list of modes or applications supported in a selected geographic location, the terminal 12 uses the information to initiate a software download with request for a specific mode.

Several examples of the service type strings, which might be found in the "Service Type Reply" are:
Service:GPRS://
Service:UMTS://
Service:WLAN://

The Directory Agent 36 can consult other Directory Agents 36 or Broker Agents 44 to fill and comply with the requested service types. The best mode or service is selected by the terminal 12. This can be based the user input at the user interface 28 or the terminal 12 automatically selects a mode or service from the server to be downloaded and the mode components are then downloaded to the terminal 12.

Automatic download enables registration of the downloaded software with one or more service providers in a given location area. The Service Agent 34 or registration server 38 and Directory Agent 36 can be used to facilitate service service registration within the extended WASLP and SLP. The Service Agent 34 or download server registers with the Directory Agent 36 by advertising its services one at a time. Registration is done using a "Service Registration" message specifying attributes for the particular service or protocol. Example modes or services are Bluetooth, GPRS and the like. One example of a Service Registration information is shown below.

Lifetime (seconds): 16-bit unsigned integer
URL (at least): service:<srvtype>://<addr-spec>
Attributes (if any): (ATTR1=VALUE),KEYWORD, (ATTR2=VAL1, VAL2)

One example of a service registration having attributes for the GPRS mode is:

| | |
|---|---|
| Lifetime: | 10800 |
| URL: | service:GPRS://igore.wco.ftp.com:515/draft |
| Attributes: | (SCOPE=SDR_Component_Download), |
| | (QoS CLASS=CLASS A), |
| | (COST =$xxx), |
| | (AVERAGE BW=123KB), |
| | UNRESTRICTED_ACCESS, |
| | (LANGUAGE=:exe), |
| | (LOCATION=<IP address, DNS etc >) |
| | (GEO_LOCATION=<Loc_Tag (Ex: "France")>) |

In the above example the geographic location information is embedded in the attribute list of the service registration message.

The Service Location Protocol module 22 communicates with the Server Agent 34 or service registration server 38. Once the modes or applications are downloaded to the terminal 12, the services and associated services are registered with a registration server 38 or Service Agent 34.

Referring now to FIG. 10 there is shown a schematic diagram of an adaptable Software Defined Radio terminal 12 for receiving automatic downloadable applications, in accordance with the present invention. The terminal 12 includes a user interface 28, a download module 18, a mode cache 36, a terminal location module 16, a Service Location Protocol module 22, a reconfiguration module 24 and an air interface module 26.

The multi-mode terminal 12 automatically receives, downloads and stores remotely transmitted software, modes and applications. Additionally, the terminal 12 activates or "runs" the downloaded applications or modes, enabling the terminal 12 to perform a variety of functions in different locations. Notably, it is contemplated that the terminal 12 can be modified to receive and run virtually any type of program, software, or mode generally known to those skilled in the art.

The user interface 28 provides information to the user, enabling the user to control the terminal 12 through commands or selected functions. It is contemplated that the user interface 28 can be any type of apparatus used for communicating generally known to those skilled in the art, such as a visual text display, video screen, a speaker, microphone, or the like.

The location and the download module 16, 18 provide the terminal reconfiguration module 24 with location information and the modes supported in the selected location to initiate reconfiguration of the SDR terminal 12.

Prior to entering a location, the download module 18 is in communication with the location module 16. The location module 16 calculates a projected time that the mobile terminal moves out of the present location to a collocation. The location server 14 in communication with the location module 16, calculates the speed and direction of the terminal to project an anticipated location. This information is then transmitted back to the mobile terminal 12. The location module 16 in connection with the location server 14 queries for current mobility and location information. The terminal location module 16 communicates within the server 14 in the system 10 to generate terminal location information. The location module 16 can also query for applications and advertisements for network services.

The location module 16 keeps track of the current location and collocations. The location module 16 transmits current location and collocation information to the download module 18. Collocation information is generated from present terminal location information supplied by the location server 14 and location module 16 and querying the location server 14 for neighbor locations, specifying the granularity of the location area.

The download module 18 of the terminal queries the system 10 for available appropriate modes and services available in terminal's current location, surrounding location (co-locations), and other selected locations using the Service Location Protocol module 22. The download module 18 determines whether such modes are currently supported in the terminal (either currently running mode or availability in the download cache). If such modes are not supported in the download cache, a download is initiated based on the mobility itinerary information provided by the user or provided by the location module 16. The location can also be determined by querying current direction and velocity of the terminal 12. Upon locating the necessary mode, the download module 18 selects the best mode.

Once the download module 18 receives a collocation information from the location module 16 or user, the download module 18 verifies that all modes (or a subset of modes for continued operation) in that region are available in the mode cache 20 assisted by the Service Location Protocol module 22. The download module 18 also queries the terminal's mode cache for available modes. After completion of the query the download module 18 then selects from a group of available modes the best mode or application for the terminal.

Figure 11:
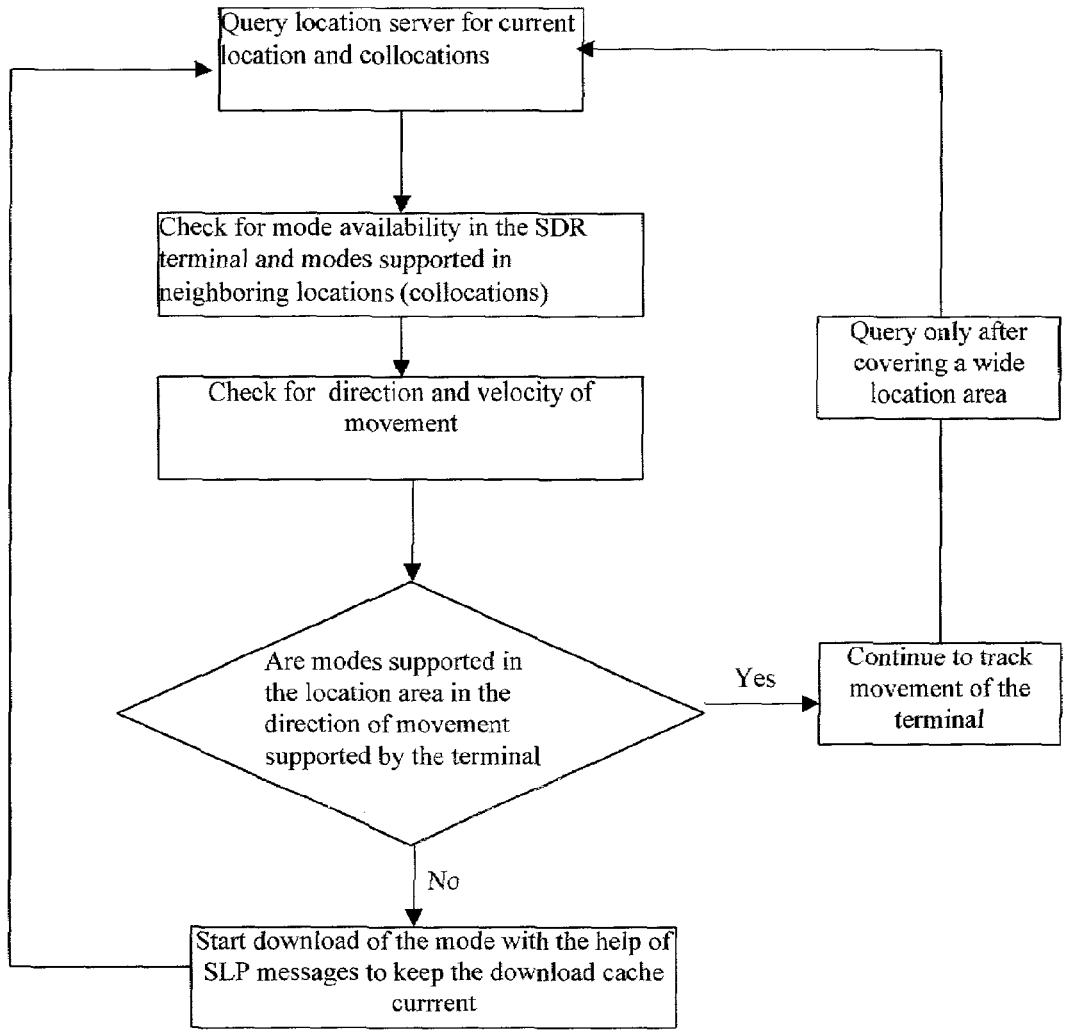
FIG. 11 is a flow diagram illustrating an example of a method for automatically downloading applications to a terminal.

The download cache 40 is used to store the mode executables or code. The download cache 20 also stores scripts, configuration files, upgrade software patches, or the like. The terminal reconfiguration module 24 uses code or executables available in the download cache 20 and reconfigures the hardware and the software state of the mobile terminal 12 to support a new mode. The above-described method is further illustrated in FIG. 11.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A system for automatically downloading radio or protocol personalities over defined channels to a mobile terminal in a wide area network, the system comprising:
   an adaptable terminal, a spatial location service for providing geographic location information to said terminal, at least one component repository, and a download server,
   the component repository including at least one downloadable component and further including a service template that defines the service attributes of said downloadable component,
   said adaptable terminal including a location module in communication with the spatial location service to define the geographic location of the mobile terminal,
   the terminal further including a User Agent for locating downloadable components in the defined geographic location using a service request that enumerates the service needs of mode attributes,
   the server directory including a listing of service templates of component repositories in a defined geographic location and a Service Agent for communicating with said component depositories and User Agents,
   wherein said User Agent queries said Service Agent in the defined geographic location and neighboring locations to locate service components that match the terminals service need attributes such that when a matching component is located said terminal automatically downloads said component to said terminal.

2. The system of claim 1, wherein the service template is machine and human understandable.

3. The system of claim 1, wherein the service template further comprises rules for service advertisement attributes.

4. The system of claim 1, wherein the service template further comprises a scope list.

5. The system of claim 1, wherein the service template further comprises a predicate string.

6. The system of claim 1, wherein the service template further comprises a Service Location Protocol string.

7. The system of claim 1, wherein the service request further comprises a template.

8. A method for downloading a component from a communication network to a mobile terminal, comprising the steps of:

determining at a location server of the communication network a projected geographic area where the mobile terminal will be at a future time;

identifying at a user agent of the communication network a protocol mode component and service attributes of the protocol mode component that is supported in the projected geographic area;

determining at the mobile terminal whether the protocol mode component and compatible service attributes match service needs of the mobile terminal;

sending a request for the protocol mode component from the mobile terminal to the network, if the protocol mode component matches the service needs of the mobile terminal;

requesting a directory agent to identify a service agent in the communication network that can communicate with a component repository, wherein the directory agent includes a listing of service agents and wherein the component repository includes the protocol mode component;

receiving the protocol mode component at the service agent from the component repository;

receiving the protocol mode component at the user agent from the service agent;

sending the protocol mode component from the user agent to the mobile terminal; and, downloading the protocol mode component at the mobile terminal before the mobile terminal enters the projected geographic area.

9. The method of claim 8, further comprising creating a service template, and populating the service template with at least one of projected geographic area information, information identifying the protocol mode component and the compatible service attributes, and information identifying the service needs of the mobile terminal.

10. The method of claim 9, wherein the population step further comprises populating the service template at at least one of the location server, the user agent, and the mobile terminal.

11. The method of claim 10, wherein the populating step further comprises populating the service template with the projected geographic area information at the location server, populating the service template with the information identifying the protocol mode component and compatible service attributes at the user agent, and populating the service template with the information identifying the service needs at the mobile terminal.

12. The method of claim 8, wherein the request further includes a service template.

13. A system for downloading components from a communication network to a mobile terminal, comprising:

a mobile terminal including a location module, a location server in communication with the location module and configured to determine where a projected geographic area of the mobile terminal will be at a future time;

a user agent that is configured to identify a protocol mode component and service attributes compatible with the protocol mode component that is supported in the projected geographic area;

a component repository including the protocol mode component;

service agents, wherein at least one of the service agents is in communication with the component repository; and, a directory agent including a listing of the service agents, wherein the mobile terminal is configured to send a service request to the user agent for the protocol mode component, if the protocol mode component matches service needs of the terminal; wherein the user agent is in communication with the at least one service agent and the directory agent, the user agent being configured to receive the protocol mode component from the at least one service agent, and the user agent being configured to send the protocol mode component to the mobile terminal, wherein the mobile terminal is configured to download the protocol mode component.

14. The system of claim 13, wherein at least one of the location server, the user agent and the mobile terminal configured to create a service template.

15. The system of claim 14, wherein at least one of the location server, the user agent, and the mobile terminal is configured to populate the service template.

16. The system of claim 14, wherein the service template is configured to store at least one of projected geographic area information, information identifying the protocol mode component and the compatible service attributes, and information identifying the service needs of the mobile terminal.

17. The system of claim 13, wherein the communication network further comprises a base station, the base station including the location server and the user agent.

18. The system of claim 13, wherein the user agent is configured to contact the directory agent to determine which of the service agents includes the protocol mode component.

* * * * *